Jan. 18, 1966     H. E. JACKSON ET AL     3,229,818
FLUID FILTERS

Filed Feb. 6, 1963     2 Sheets-Sheet 1

INVENTORS
HAROLD ERNEST JACKSON
PETER WILLIAM STRIPP
BY
MASON, KOLEHMAINEN,
RATHBURN & WYSS
ATTORNEYS

Jan. 18, 1966    H. E. JACKSON ET AL    3,229,818
FLUID FILTERS
Filed Feb. 6, 1963    2 Sheets-Sheet 2

INVENTORS
HAROLD ERNEST JACKSON
+
PETER WILLIAM STRIPP
BY
MASON, KOLEHMAINEN,
RATHBURN & WYSS
ATTORNEYS

United States Patent Office 3,229,818
Patented Jan. 18, 1966

3,229,818
FLUID FILTERS
Harold E. Jackson, Plymouth, Devon, and Peter W. Stripp, Billacombe, Plymouth, Devon, England, assignors to Tecalemit (Engineering) Limited
Filed Feb. 6, 1963, Ser. No. 256,616
Claims priority, application Great Britain, Feb. 9, 1962, 5,056/62
3 Claims. (Cl. 210—457)

This invention relates to filters for filtering air or other gases or for filtering liquids and it has for its principal object the provision of improvements in such filters and in the construction thereof.

Another object of the invention is to provide an improved filter element which comprises one or more layers of filter material and a support for the filter material, and which includes improved means for securing the edges of the filter material to the support.

A more specific object of said invention is the provision of such a filter element in which an edge portion or portions of the support are bent over the filter material so as to grip the latter.

As the support for said filter material it is preferred to use sheet metal which has been formed with a number of openings through which the fluid being filtered passes, although the support may be made of materials other than metal and the metal or other material may be in the form of gauze or in other openwork form.

The support and the filter material are preferably arranged to form an annulus of cylindrical or other form, such that the fluid being filtered passes through the filter material either inwardly towards the centre of the annulus or outwardly away from the centre, as may be preferred.

As the filter material it is preferred to use, and this forms an important feature of the invention, a sheet or sheets formed of a mass of fibres, which latter are preferably formed of a copolymer of a vinyl chloride. with an acrylonitrile.

The invention further provides a method of constructing a fluid filter using at least one sheet of filter material and a support for the filter material, which support is formed of a sheet metal or other material, such as metal gauze or the like, having openings through it for the passage of the fluid being filtered, which method comprises fitting the filter material against the support and bending parts of the support over the edges of the filter material in order to secure the filter material to the support. Preferably the support is also bent so as to bring two of its edges together in order to form an annular filter element, these edges being secured together by any suitable means. The filter material may be attached to the support either before or after the latter is formed into an annulus, the attachment being preferably effected by bending over those edges of the support which come between the edges which are secured together to form the annulus.

According to a preferred method of carrying out the invention a strip of sheet metal formed with a series of openings of elongated rectangular slit-like or other suitable form is used and the two side edges of the strip are folded over and clamped against the edges of a strip of filter material which is fitted along the strip. The ends of the strip, which is formed into an annulus either before (which is preferred) or after the fitting of the filter material, may be secured together by bending a lug or lugs provided on one end of the support round a part of the other end thereof, the said lug or lugs being passed through an opening in the support near this latter end.

According to one form of construction which is representative of this invention the parts of the support and of the filter material between the two side edges thereof are bent either inwardly or preferably outwardly so that the length of the filter element along the axis thereof is reduced, while still providing a substantial filtering area.

It is preferred, and this forms an important feature of this invention, to use for the filter material at least one sheet or layer formed of fibres made of a synthetic plastic material and it is preferred to use for this purpose a copolymer of vinyl chloride and acrylonitrile. As will be described in greater detail hereinafter such fibres can be used in any desired thickness while the thickness and density of the fibrous mass or sheet can be adjusted to suit particular requirements. The fibres may if necessary be curled.

It has been found that fibres which are formed from a copolymer of vinyl chloride and an acrylonitrile, particularly when these are formed into a sheet or layer of closely intermingled fibres, possess a number of advantages over other synthetic fibres which we have tested for use in the manufacture of fluid filters, especially in the case of air filters for internal combustion engines.

Further features of the present invention will become apparent from the following description of a preferred embodiment thereof. An element for use in the air filter for an internal combustion engine will be described although, as has been stated, the invention is applicable to filters for other gases or uses and to filters for liquids.

Reference will be made to the accompanying drawings, in which.

Figure 1:
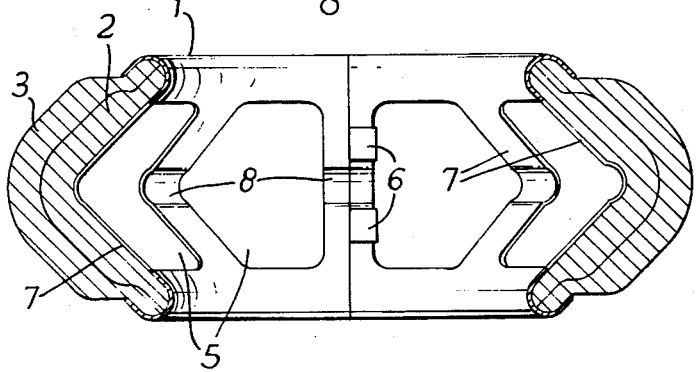
FIGURE 1 is a vertical sectional view showing the filter element.

Referring first to FIGURE 1, the filter shown comprises a support 1 the construction of which will be described. This carries one or more layers of a fibrous filter material which will also be described, two such layers 2 and 3 being shown.

The support 1 is formed from a strip 4 (FIGURE 2) of sheet steel or other metal which is stamped to form in it a series of elongated openings or slots 5. These extend transversely to the length of the strip and are designed to provide free passage for the air (or other fluid) which is being filtered.

At one of its ends the strip 4 is formed with a pair of projecting lugs 6 which are used for connecting the ends of the strip together when the latter is shaped to form the support 1. To do this the strip 4 is bent into the form of a cylinder, after which the lugs 6 are passed through the openings 5a nearest the other end of the strip 4 and are then folded back and pinched on to the end of the latter.

The support 1 may be left in the form of an open cylinder, but if it is desired to produce a shorter and flatter filter element, by reducing the axial length thereof, this may be done by applying pressure to the ends of the annular support so as to force the central parts 7 of the strip 4 forming it inwardly towards the centre, or outwardly (as shown), the latter being preferred. This bending of the material of the support can be done at any stage during the production of the element, either before or after the attachment of the filter material and before or after the ends of the strip 4 have been fitted together. It is often preferred to do it after the side edges of the support have been bent over ready to receive the filter material (as will be described, but before they have been clamped on to the latter, and either before or after the support is formed into an annulus ready to receive the filter material.

Figure 4:
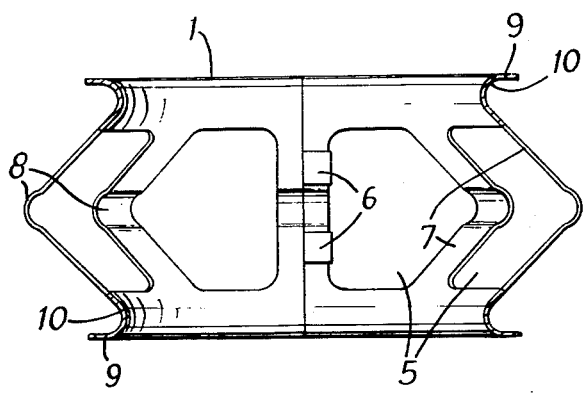
FIGURE 4 is a vertical cross-section of the support shown in FIGURE 3.

In order to assist in the bending of the material of the support 1 the parts 7 of the latter between the openings 5 are preferably formed along the longitudinal centre line of the support with a series of arcuate depressions 8 which project from the support on the side of which the central parts of the latter will project. Thus, a preferred from of support which has been assembled into the form of an annulus ready for the fitting of the filter material may, when viewed in cross-section as shown in FIGURE 4, have walls of generally V shape, the points of the V projecting outwardly and being of rounded shape, being formed by the arcuately-bent central parts 7 of the support.

Whether or not the parts 7 are deformed, or bent as has been described and as is shown in the drawings, the upper and lower edges of the strip 4 are bent outwardly, as shown at 9, in order to form channels 10 (FIGURE 4) which are adapted to receive the edges of the filter material 2 and 3. This may be done before or after the strip 4 is formed into an annulus and before or after the bending of the parts 7, if this is done.

For the filter material one or more sheets or layers (in the present instance, two) of a fibrous material is or are used. For this material it is preferred to use fibres which are formed of a copolymer of vinyl chloride and acrylonitrile and which are known under the name "Dynel-fibre." Such fibres are imported from the United States of America by the Union Carbide Company of London and are formed into sheets by Johnsons Fabrics Ltd., of Earby, Colne, Lancashire.

A preferred material is one known as Type 60 Natural 12 Denier Dynel 2½" staple fibre which is made up into sheets ½ inch thick and weighing 8 ounces per square yard. One, two or more layers of this material may be used, depending on the size of the filter and its intended purpose. If necessary the density of the material can be varied by forcing a gas through it, while the fibres may be curled by a leaching process.

The filter material is cut into two strips the width of which is such that their edges will engages in the channels 10 with the two layers of filter material drawn over the parts 7 of the support 1 in the manner shown in FIGURE 1. The strips of filter material are of such a length that their ends abut against each other, or they may overlap.

The abutting or overlapping edges of the filter material 1 and 2 may be attached to each other by the application of a suitable adhesive or by means of heat (if the filter material is thermoplastic).

With the strips 1 and 2 of filter material in the positions shown in FIGURE 1, the edge portions 9 of the support are pressed or crimped inwardly, by any suitable means, so as to secured the filter material in position.

Figure 2:
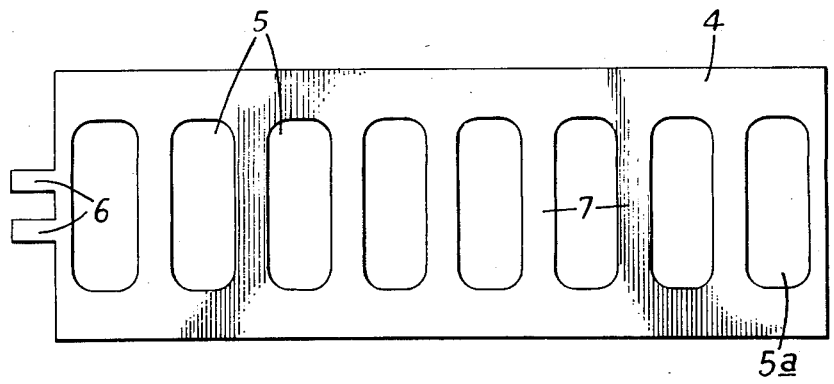
FIGURE 2 is a plan view showing the material which is used for making the support or frame of the filter element shown in FIGURE 1, after the material has been cut to shape but before it is shaped to form the support.
Figure 3:
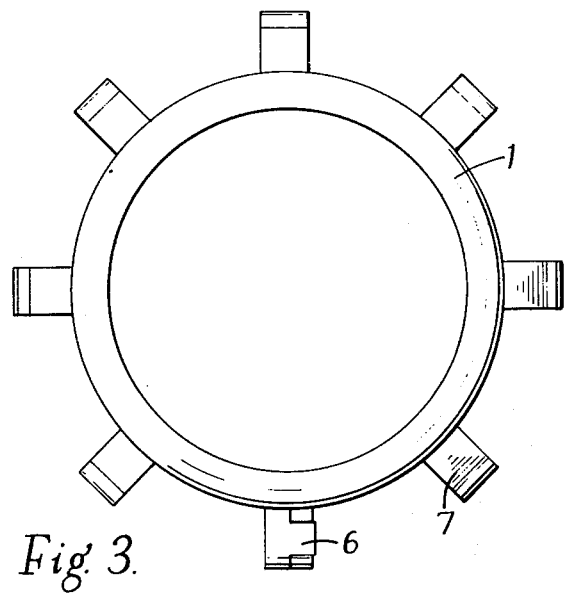
FIGURE 3 is a plan view showing the support which has been formed from the material shown in FIGURE 2.

Although the filter material has been described as being fitted to the support 1 after the latter has been brought into its finished form, apart from the pressing or crimping of the lips 9, this is not essential. The strip or strips of filter material could be fitted to the strip 4 before the latter is brought into its annular form. To do this the upper and lower edges of the material shown in FIGURE 2 are first bent over so as to form channels (corresponding to the channels 10) for the edges of the filter material, after which one or more strips of the latter are laid along the strip 4, to which they are secured by pressing or crimping the edges of the latter.

The strip 4 is then bent round and its ends joined in the manner which has been described, the ends of the filter material preferably also being secured together by means of heat or using an adhesive.

If the filter element is to be of the flattened form shown in FIGURE 1 the parts 7 are bent as has been described, which may be done before or after the fitting of the filter material and before or after the bending of the strip 4 into an annulus.

Irrespective of the sequence of steps in its construction the filter element which has been described and which is shown in the drawings has the advantage that it occupies little depth when fitted with its axis vertical, as is usually the case. The rounded or arcuate shape of the parts 7 of the support, where the filter material passes round them, reduces the risk of strain on the latter and keeps the greatest possible area available for filtration purposes.

Although it is preferred to use a fibrous filter material, as has been stated, the support which has been described can be used with filter materials of other kinds including, for example, foam materials.

The invention is primarily concerned with filter elements as a whole, such as have been described. It is however, also concerned with the use of the specified fibrous filter material formed of a copolymer of a vinyl chloride with an acrylonitrile for filters having other types of support for the filter material.

We claim:
1. An annular fluid filter element comprising a unitary rigid support having spaced annular edge portion, said support including a plurality of ribs interconnecting said edge portions to define therebetween openings elongated in the direction of the space between said edge portions, said ribs being deformed from a straight shape to a generally V-shaped to reduce the axial length of the said support, and a layer of filter material extending between said edge portions and overlying said ribs, said filter material engaging said ribs and secured to said edge portions.

2. The annular fluid filter element of claim 1 wherein said layer of filter material comprises a closely intermingled coherent mass of fibers consisting of a copolymer of vinyl chloride and acrylonitrile.

3. The annular fluid filter element of claim 1 wherein said edge portions are channel-shaped for receiving therein the edges of said layer of filter material, said channel-shaped edge portions being deformed to grip and hold said edges of said layer of filter material.

References Cited by the Examiner
UNITED STATES PATENTS

| | | | |
|---|---|---|---|
| 759,903 | 5/1904 | Moeckel | 210—484 X |
| 1,284,615 | 11/1918 | Devey | 210—497 |
| 2,132,940 | 11/1938 | Farmer | 55—517 X |
| 2,813,632 | 11/1957 | Muller | 210—498 X |
| 3,062,379 | 11/1962 | Bryan | 210—500 |
| 3,093,583 | 6/1963 | Stoll | 210—487 |

REUBEN FRIEDMAN, *Primary Examiner.*

HERBERT L. MARTIN, *Examiner.*